(12) United States Patent
Ruppelt et al.

(10) Patent No.: US 6,795,810 B2
(45) Date of Patent: Sep. 21, 2004

(54) WEB-ENABLED METHOD AND SYSTEM FOR ASSISTING A CONSUMER TO REACH A PURCHASING DECISION REGARDING A PRODUCT

(75) Inventors: Kevin Michael Ruppelt, Louisville, KY (US); Tamara Yvette Clay, Louisville, KY (US)

(73) Assignee: General Electric Company

( * ) Notice: Subject to any disclaimer, the term of this patent is extended or adjusted under 35 U.S.C. 154(b) by 0 days.

(21) Appl. No.: 09/747,441

(22) Filed: Dec. 26, 2000

(65) Prior Publication Data

US 2003/0050844 A1 Mar. 13, 2003

(51) Int. Cl.$^7$ .............................................. G06F 17/60
(52) U.S. Cl. ...................................... 705/26; 702/184
(58) Field of Search .................. 705/26, 27; 702/183, 702/184

(56) References Cited

U.S. PATENT DOCUMENTS

| | | | |
|---|---|---|---|
| 4,899,292 A | | 2/1990 | Montagna et al. |
| 5,293,309 A | | 3/1994 | Sakai et al. |
| 5,317,503 A | | 5/1994 | Inoue |
| 5,432,904 A | | 7/1995 | Wong |
| 5,504,674 A | * | 4/1996 | Chen et al. ................ 705/4 |
| 5,950,169 A | * | 9/1999 | Borghesi et al. ........... 705/4 |
| 5,965,858 A | | 10/1999 | Suzuki et al. |
| 6,016,504 A | * | 1/2000 | Arnold et al. ............. 709/200 |
| 6,070,149 A | | 5/2000 | Tavor et al. |
| 6,070,155 A | | 5/2000 | Cherrington et al. |
| 6,125,352 A | * | 9/2000 | Franklin et al. ............ 705/26 |

FOREIGN PATENT DOCUMENTS

WO    WO 00/067145 A2 * 11/2000

OTHER PUBLICATIONS

"Aimtech and Sony Electronic Publishing to Link Multimedia Authoring Tools", Multimedia Publisher, v.4, n.6, Jun. 1993.*

* cited by examiner

*Primary Examiner*—F. J. Bartuska
(74) *Attorney, Agent, or Firm*—George L. Rideout, Esq.; Enrique J. Mora, Esq.; Beusse, Brownlee, Wolter, Mora & Maire, P.A.

(57) ABSTRACT

Computerized method and system for assisting a consumer reach a decision regarding repair or replacement of a product usable by the consumer is provided. The method allows for providing to the consumer a Web page including a plurality of data fields to be filled with data selectable by the consumer from a corresponding plurality of menus including respective product attributes. The method further allows for processing the product attributes selected by the consumer relative to stored economic value data of products with generally similar attributes to those of the product usable by the consumer. The processing is configured to provide options available to the consumer regarding any repair or replacement of the product usable by the consumer. The consumer is provided with a Web page hierarchically displaying the options and wherein each of the options includes a respective hyperlink for enabling the consumer to select one of the options.

24 Claims, 5 Drawing Sheets

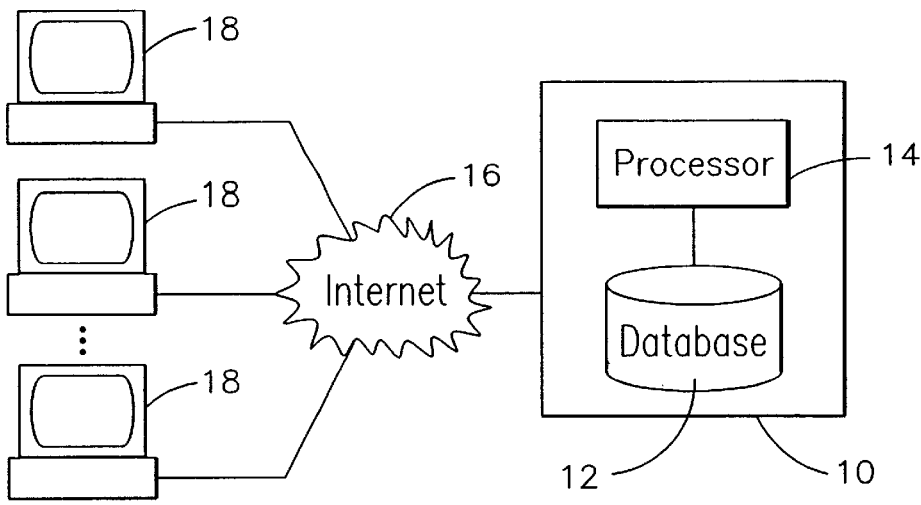

FIG. 1

Repair vs. Replace Calculator

Although GE Appliances are built to last, we recognize that in the life of any appliance our customers are faced with the decision to repair or to replace. With our Repair vs. Replace Calculator, GE makes it simple to make that decision:

Choose a product.
[Please select... ▽]

What type of product do you have?
[Please select... ▽]

What size do you have?
Help me determine my Refrigerator size.
[Please select... ▽]

How old is your product (in years)?
[Please select... ▽]

Nature of Problem.
[Please select... ▽]

( Repair or Replace? )    ( Start Over )

FIG. 3

WEB-ENABLED METHOD AND SYSTEM FOR ASSISTING A CONSUMER TO REACH A PURCHASING DECISION REGARDING A PRODUCT

BACKGROUND OF THE INVENTION

The present invention is generally related to computerized method and system for managing electronic data, and, more particularly, the present invention is related to web-enabled system and method for assisting a consumer to reach a decision regarding repair or replacement of a product usable by the consumer.

Most consumers at one time or another have faced tough decisions regarding products that they use in their daily lives. For example, the consumer may be faced with deciding whether to repair or replace various products, such as appliances, home entertainment equipment, home office equipment, transportation equipment, etc.

The decision may be difficult because, on the one hand, the consumer may not want to replace a product while still at the prime of its expected useful life since this likely results in unrecoverable depreciation costs. On the other hand, the consumer may not want to get "stuck" with a product that is close to or has reached its expected useful life since this may result in frequent and costly repairs.

In either case, if the consumer makes a decision on the spur of the moment as to whether replace or repair the product without researching any relevant data, such as cost of any repairs and/or maintenance, present value of the product, replacement costs, etc., there is a high probability that such decision may not be a satisfactory decision in the long run. Unfortunately, for the consumer to make an informed decision would require a substantial amount of time to gather the type of data that would result in a sound decision.

In view of the above, it would be desirable to provide to the consumer a user-friendly tool that would assist the consumer to make a sound decision regarding replacement or repair of the product without the consumer being rushed by pushy sales personnel. It would be further desirable to take advantage of Web-enabled communication systems to make such tool inexpensively and readily available to large segments of the population without requiring any large number of actions on the part of the consumer to use the tool.

BRIEF SUMMARY OF THE INVENTION

Generally speaking, the present invention fulfills the foregoing needs by providing in one aspect thereof a computerized method for assisting a consumer reach a decision regarding repair or replacement of a product usable by the consumer. The method allows for providing to the consumer a Web page including a plurality of data fields to be filled with data selectable by the consumer from a corresponding plurality of menus including respective product attributes. The method further allows for processing the product attributes selected by the consumer relative to stored economic value data of products with generally similar attributes to those of the product usable by the consumer. The processing is configured to provide options available to the consumer regarding any repair or replacement of the product usable by the consumer. The consumer is provided with a Web page hierarchically displaying the options and wherein each of the options includes a respective hyperlink for enabling the consumer to select one of the options.

The present invention further fulfills the foregoing needs by providing in another aspect thereof a computerized system for assisting a consumer reach a decision regarding repair or replacement of a product usable by the consumer. The system includes a processor configured to provide a Web page including a plurality of data fields to be filled with data selectable by the consumer from a corresponding plurality of menus including respective product attributes. Memory is used for storing economic value data of products with generally similar attributes to those of the product usable by the consumer. A processor is configured to process the product attributes selected by the consumer relative to the stored economic value data to provide options available to the consumer regarding any repair or replacement of the product usable by the consumer. A processor is configured to provide to the consumer a Web page hierarchically displaying the options and wherein each of such options includes a respective hyperlink for enabling the consumer to select one of such options.

DESCRIPTION OF THE DRAWINGS

FIG. 1 is a schematic of an exemplary web-enabled system that may be used for practicing one embodiment of the present invention.

FIG. 3 is an exemplary Web page including a plurality of data fields to be filled with data selectable by the consumer from a corresponding plurality of menus including respective product attributes.

DETAILED DESCRIPTION OF THE INVENTION

Figure 2:
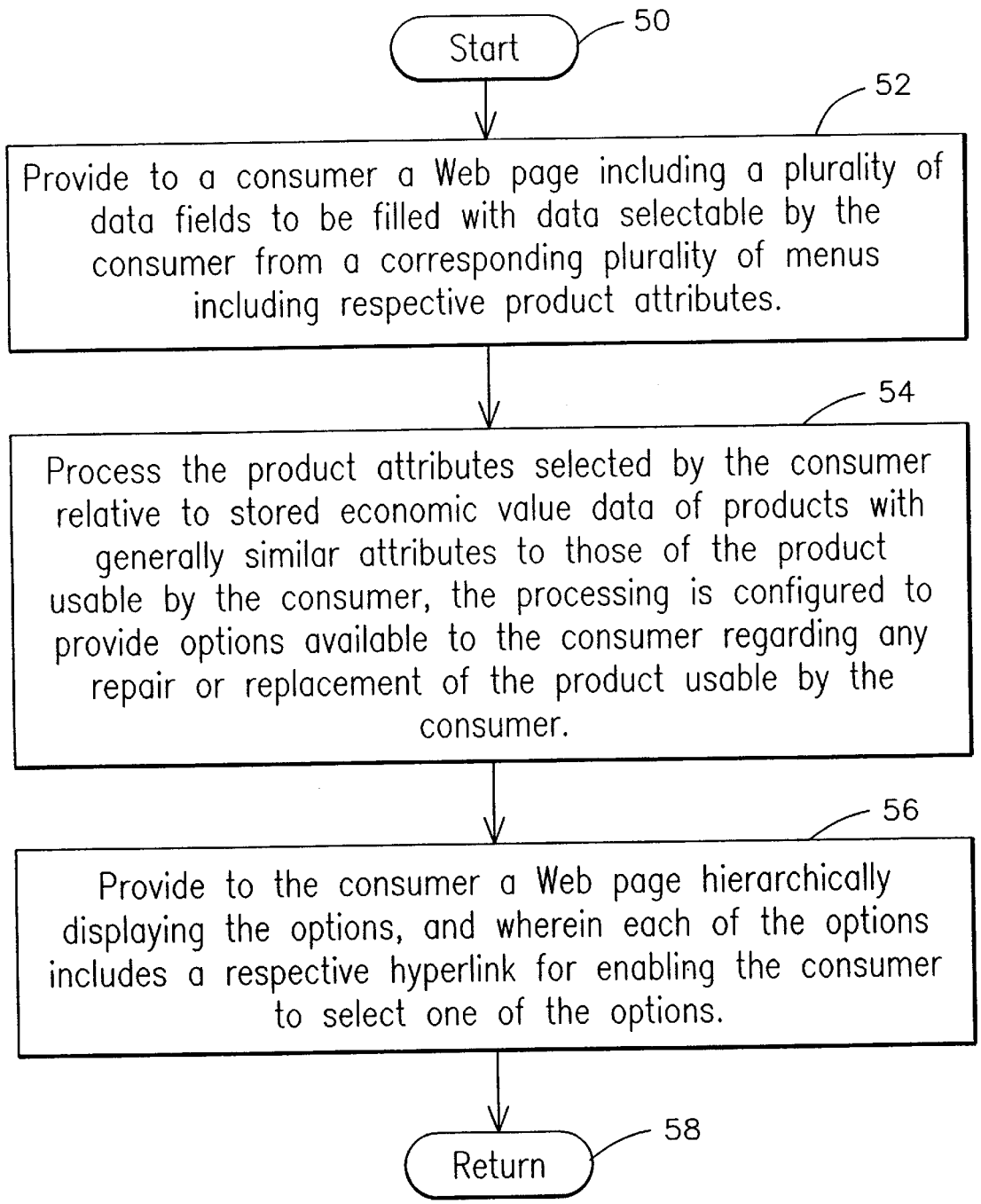
FIG. 2 is a flow chart illustrating exemplary steps of a method for assisting a consumer reach a decision regarding repair or replacement of a product usable by the consumer.

FIG. 1 is a schematic representation of an exemplary web-enabled system that may be used for assisting a consumer reach a decision regarding repair or replacement of a product used by the consumer. In one exemplary embodiment, a site, such as may be operated and managed by the assignee of the present invention, processes the information supplied by the consumer to assist the consumer make their decision regarding the product. By way of example, the site may comprise a server 10 made up of a database 12 coupled to a processor 14 that processes in respective processing modules electronic data configured to enable online transactions over a suitable telecommunications medium, such as a web-enabled communications medium 16. A telecommunications device 18, such as a computer loaded with any commercially available web browser may be used by the purchaser, as described below in greater detail, to download web pages from server 10 and to transmit data back to server 10. It will be appreciated that the site and the purchasers are generally remote relative to one another.

Figure 4:
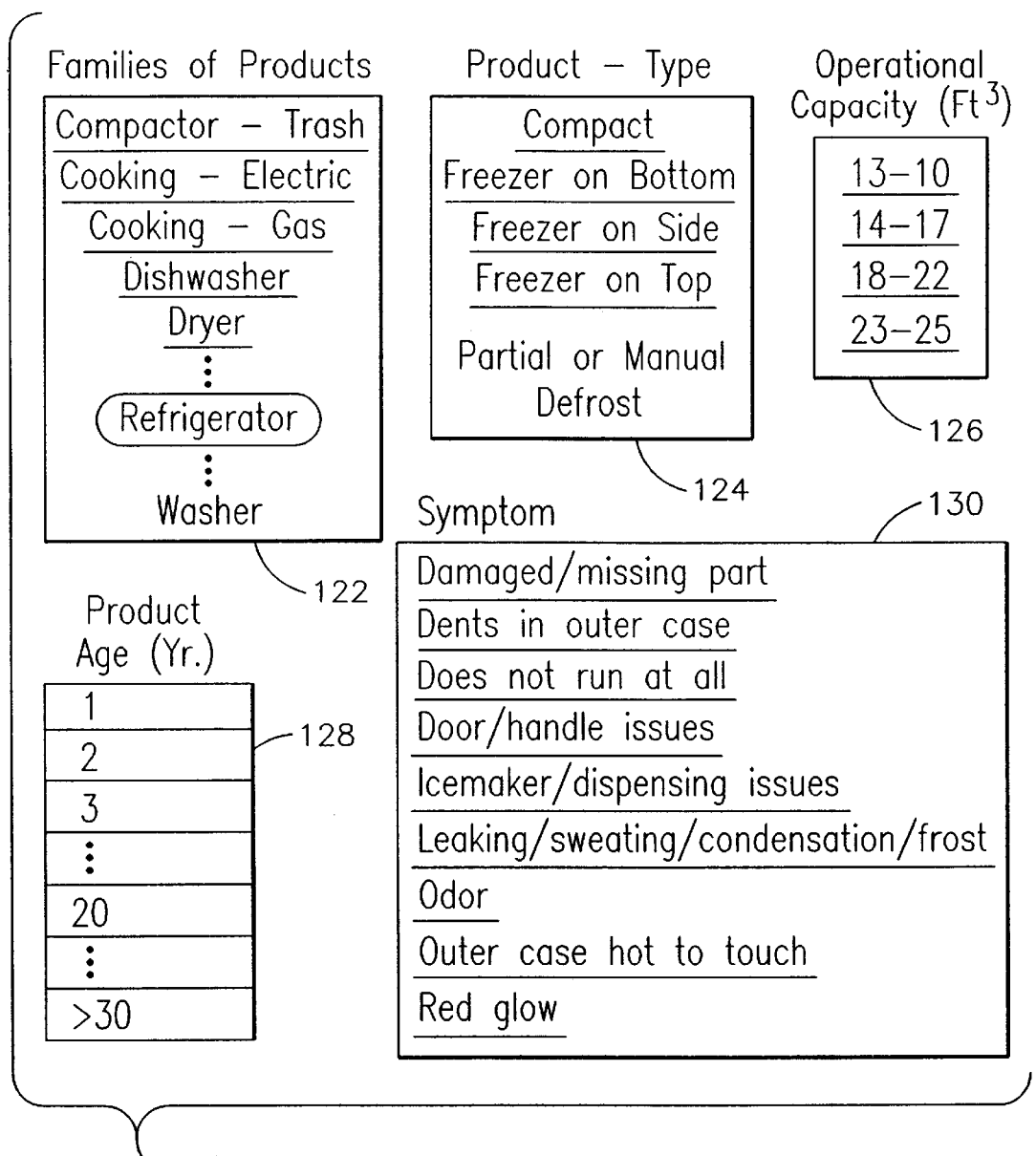
FIG. 4 illustrates a plurality of exemplary menus such as may be used to identify product attributes, such as product family, product-type, age, etc., of a product usable by the consumer.

FIG. 2 is a flow chart of a web-enabled method for assisting a consumer to reach a decision regarding repair or replacement of a product usable by the consumer. Subsequent to start step 50, step 52 allows for providing to the consumer a web page 100 (FIG. 3) including a plurality of data fields, e.g., data fields 102, 104, 106, 108 and 110 (FIG. 3) to be filled with data selectable by the consumer from a corresponding plurality of menus 120 (FIG. 4) including respective product attributes. Each respective menu may be opened when the consumer clicks on a respective drop-down menu selector, e.g., menu selectors 103, 105, 106, 109 and 111. By way of example, a first one of the plurality of menus (e.g., menu 122 (FIG. 4)) may be opened by clicking menu selector 102 (FIG. 3) and comprises data indicative of respective families of products about which the customer seeks assistance. As shown in menu 122, exemplary families of products may include in the context of appliances, trash compactors, electric cooking ranges, gas cooking ranges, etc. It will be understood that the principles of the present invention are not limited to appliances since the present invention may be employed equally effective in any context where the consumer faces a decision of whether to repair or replace a product and which decision generally has monetary implications to the consumer.

A second one of the plurality of menus (e.g., menu 124) (FIG. 4) may be opened by the consumer by clicking menu selector 105 (FIG. 3) and comprises data indicative of product type within a given family of products. Assuming, for example, that the consumer selected "refrigerator" as the family of products to be analyzed, then, as shown in menu 124, exemplary product types may indicate whether the refrigerator under consideration is a compact type of refrigerator, or whether the refrigerator has a bottom freezer, or a side freezer, or a top freezer, etc.

A third one of the plurality of menus (e.g., menu 126) (FIG. 4) may be opened by the consumer by clicking menu selector 107 (FIG. 3) and comprises data indicative of product operational capacity. Once again assuming the consumer selected "refrigerator" as the product of interest, then exemplary refrigerator capacity may be as illustrated in menu 126. For example, assuming the capacity of the refrigerator under analysis is 20 cubic feet, then the consumer will select the range from 18 to 22 cubic feet. In case the consumer needs assistance to determine the product capacity, a window may be displayed wherein visual assistance to determine the refrigerator size will be given to the customer. It will be appreciated that product attribute data included in menu 126 may not be applicable to certain type of products and, if that is the case, the consumer will not be prompted to fill such data.

A fourth one of the plurality of menus (e.g., menu 120 (FIG. 4)) may be opened by the consumer by clicking menu selector 109 (FIG. 3) and comprises data indicative of product age. For example, assuming the age of the product is three years old, then the consumer would select the number three to be entered in data field 108 (FIG. 3). A fifth one of the plurality of menus may comprise data indicative of symptoms that may be associated with product malfunctions. For example, assuming the refrigerator does not run at all, then the consumer would select that entry to fill data field 106 (FIG. 3). It will be appreciated that further auxiliary troubleshooting screens may be presented to the consumer to further narrow the malfunction and/or suggest actions that may correct the malfunction without having to schedule servicing.

Returning to FIG. 2, step 54 allows for processing the product attributes selected by the consumer relative to economic value data of products with generally similar attributes to those of the product usable by the consumer. The processing is configured to provide options that may be available to the consumer regarding any repair or replacement of the product usable by the consumer.

In one exemplary embodiment, the economic value data is based on survey data conducted for the Association of Home Appliance Manufacturers. For example, assuming that the consumer has a 10-year-old refrigerator with a top freezer, and further assuming estimated repairs to be within a predefined range, then relating the product attributes selected by the consumer against the economic value data of products with generally similar attributes to those of the product of interest the consumer would allow to determine on sound economic basis the options most suitable to the consumer. Step 56 further allows to provide to the consumer a Web page 200 (FIGS. 5–7) hierarchically displaying the options available to the consumer. Each of the options includes a respective hyperlink for enabling the consumer to select one of the options displayed on Web page 200.

Figure 5:
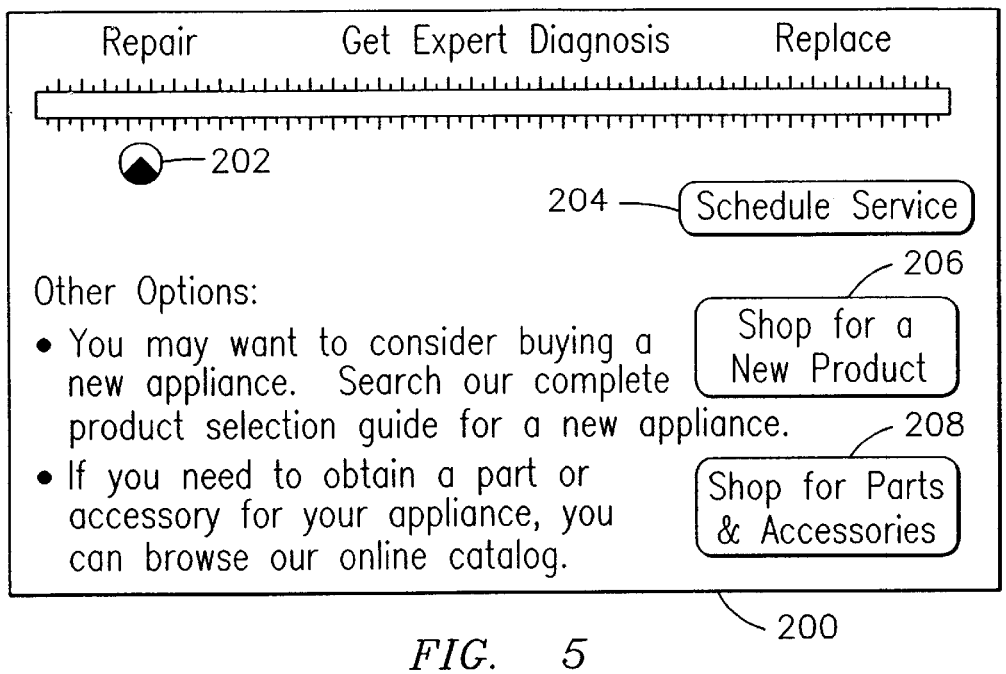
FIGS. 5–7 illustrate Web pages hierarchically displaying exemplary options available to the consumer for various product attributes.

FIG. 5 illustrates a situation wherein the best option available to the consumer, as indicated by pointer 202, would be to repair the product. As suggested above, a hyperlink 204 is associated with the repair option to provide electronic access to a respective portal in the site configured to execute a transaction that enables the consumer to schedule and purchase the service online. As further shown in FIG. 5, even though, the best option based on the product attribute supplied by the consumer would be to repair the product, other options that the consumer has may include to explore purchasing a new product, such as may be pursued by clicking hyperlink 206. Another option, for a handy consumer may be to order parts and/or accessories and in this case hyperlink 208 would allow the consumer to explore that option.

Figure 6:
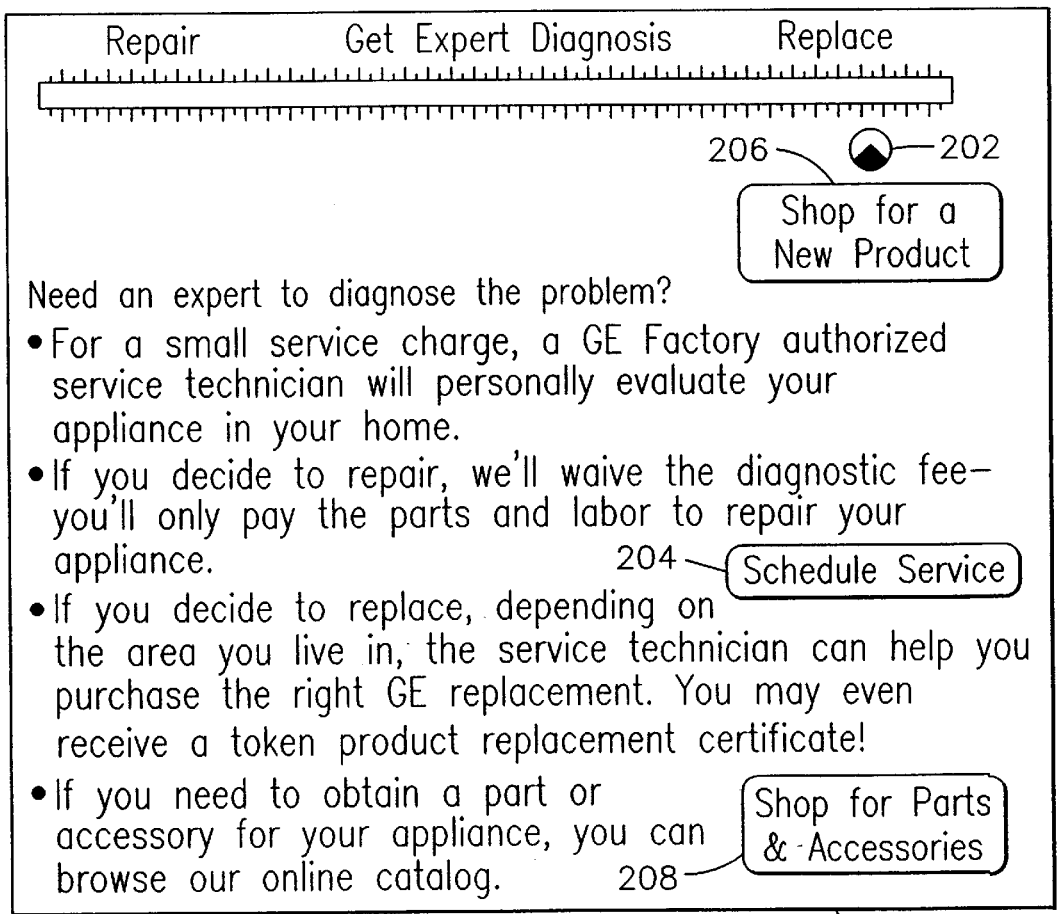

FIG. 6 illustrates a situation wherein the best option available to the consumer, as indicated by pointer 202, would be to purchase a new product. As suggested above, hyperlink 206 is associated with the option to purchase a new product and provides access to a portal in the site configured to execute a transaction that enables the consumer to purchase a replacement product online. As suggested above, other options, such as the repair option or the option for ordering parts or accessories are also displayed in the scenario portrayed in FIG. 6.

Figure 7:
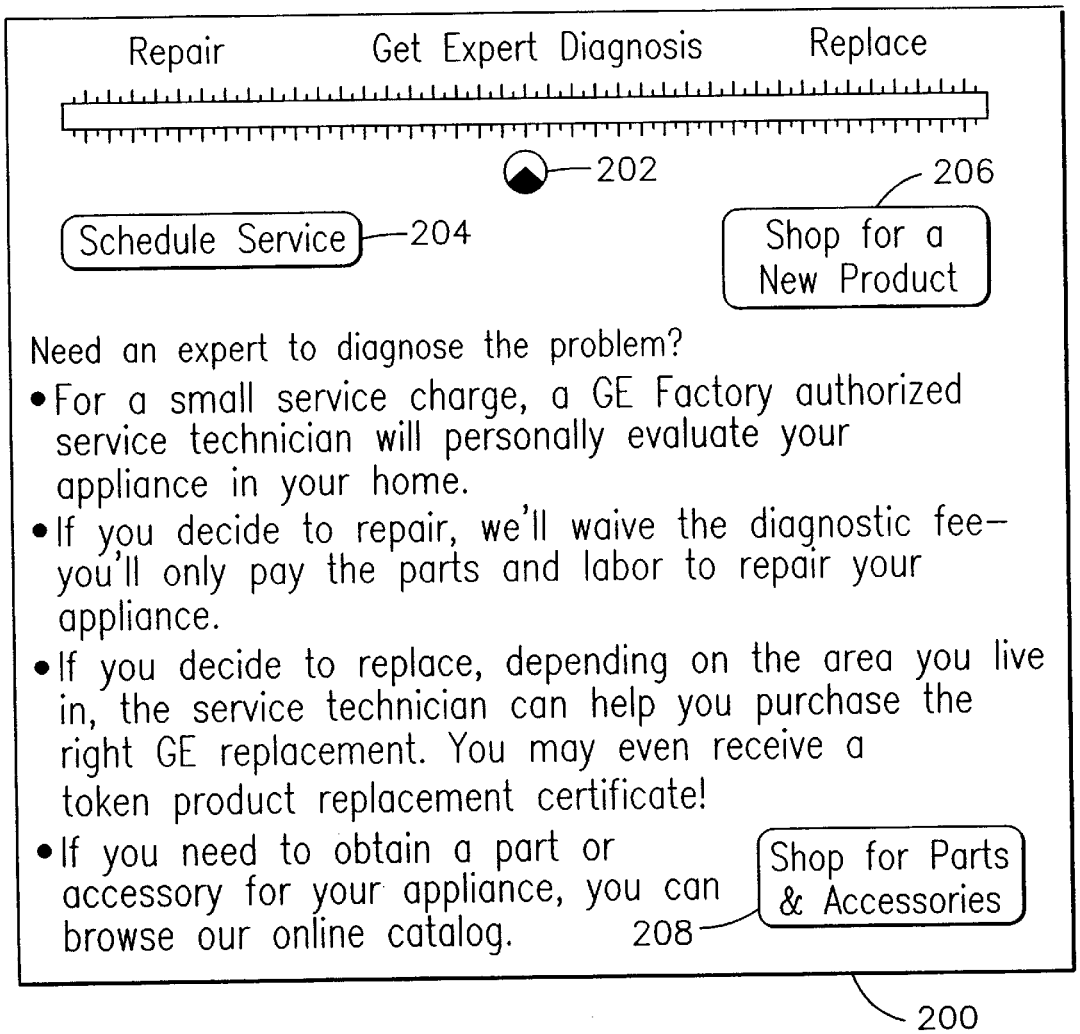

FIG. 7 illustrates a situation wherein further analysis may be required to determine a most appropriate option for the consumer. For example, there may be situations where neither the repair or replace options are clear-cut, and in this case the customer has the option to schedule consultation with an expert to determine a most appropriate option for the consumer. It will be appreciated that other informational messages for assisting the consumer make a decision may be displayed. For example, for energy-conscious consumers Web-pages comparing the energy efficiency of an older product versus a newer product may be downloaded to the consumer. It is believed that the present invention will facilitate to the consumer to make decisions best matching the economic realities associated with the product attributes of the product under consideration, without having to spend a great deal of time in researching data that may not be easy to collect, analyze, or both.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

It will be understood that the specific embodiment of the invention shown and described herein is exemplary only.

Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A computerized method for assisting a consumer reach a decision regarding repair or replacement of a product usable by the consumer, the method comprising:

providing to the consumer a Web page including a plurality of data fields to be filled with data selectable by the consumer from a corresponding plurality of menus including respective product attributes;

processing the product attributes selected by the consumer relative to stored economic value data of products with generally similar attributes to those of the product usable by the consumer, the processing being configured to provide options available to the consumer regarding any repair or replacement of the product usable by the consumer;

generating a Web page comprising a hierarchical arrangement of the options available to the consumer regarding any repair or replacement of the product;

displaying a pointer in the generated Web page for identifying a preferred one of said options; and providing a respective hyperlink with each of said options for enabling the consumer to select one of said options.

2. The method of claim 1 wherein a first one of the plurality of menus comprises data indicative of respective families of products about which the customer seeks assistance.

3. The method of claim 2 wherein a second one of the plurality of menus comprises data indicative of product type within a given family of products.

4. The method of claim 3 wherein a third one of the plurality of menus comprises data indicative of product operational capacity.

5. The method of claim 4 wherein a fourth one of the plurality of menus comprises data indicative of product age.

6. The method of claim 4 wherein a fifth one of the plurality of menus comprises data indicative of symptoms that may be associated with product malfunctions.

7. The method of claim 1 wherein a first of the options available to the consumer is to purchase a new product.

8. The method of claim 1 where the respective hyperlink associated with said first option provides electronic access to a site configured to execute a transaction that enables the consumer to purchase said product online.

9. The method of claim of claim 7 wherein a second of the options available to the consumer is to have service executed on the product.

10. The method of claim 9 wherein the respective hyperlink associated with said second option provides electronic access to a site configured to execute a transaction that enables the consumer to purchase said service online.

11. The method of claim 9 wherein a third of the options available to the consumer is to purchase parts for the product.

12. The method of claim 11 wherein the respective hyperlink associated with said third option provides electronic access to a site configured to execute a transaction that enables the consumer to purchase said parts online.

13. A computerized system for assisting a consumer reach a decision regarding repair or replacement of a product usable by the consumer, the system comprising:

a processor configured to provide a Web page including a plurality of data fields to be filled with data selectable by the consumer from a corresponding plurality of menus including respective product attributes;

memory for storing economic value data of products with generally similar attributes to those of the product usable by the consumer;

a processor configured to process the product attributes selected by the consumer relative to the stored economic value data to provide options available to the consumer regarding any repair or replacement of the product usable by the consumer;

a processor configured to generate a Web page comprising a hierarchical arrangement of the options available to the consumer regarding any repair or replacement of the product;

a pointer displayed in the generated Web page for identifying a preferred one of said options; and a respective hyperlink provided with each of said options for enabling the consumer to select one of said options.

14. The system of claim 13 wherein a first one of the plurality of menus comprises data indicative of respective families of products about which the customer seeks assistance.

15. The system of claim 14 wherein a second one of the plurality of menus comprises data indicative of product type within a given family of products.

16. The system of claim 15 wherein a third one of the plurality of menus comprises data indicative of product operational capacity.

17. The system of claim 16 wherein a fourth one of the plurality of menus comprises data indicative of product age.

18. The system of claim 16 wherein a fifth one of the plurality of menus comprises data indicative of symptoms that may be associated with product malfunctions.

19. The system of claim 13 wherein a first of the options available to the consumer is to purchase a new product.

20. The system of claim 13 where the respective hyperlink associated with said first option provides electronic access to a site configured to execute a transaction that enables the consumer to purchase said product online.

21. The system of claim of claim 19 wherein a second of the options available to the consumer is to have service executed on the product.

22. The system of claim 21 wherein the respective hyperlink associated with said second option provides electronic access to a site configured to execute a transaction that enables the consumer to purchase said service online.

23. The system of claim 21 wherein a third of the options available to the consumer is to purchase parts for the product.

24. The system of claim 23 wherein the respective hyperlink associated with said third option provides electronic access to a site configured to execute a transaction that enables the consumer to purchase said parts online.

* * * * *